(12) United States Patent
Hayasaka et al.

(10) Patent No.: US 11,892,423 B2
(45) Date of Patent: Feb. 6, 2024

(54) SENSOR AND PRODUCTION METHOD FOR SAME

(71) Applicant: SUMITOMO CHEMICAL COMPANY, LIMITED, Tokyo (JP)

(72) Inventors: Megumi Hayasaka, Osaka (JP);
Yoshifumi Komatsu, Osaka (JP);
Yoshihiro Harada, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/770,842

(22) PCT Filed: Mar. 25, 2019

(86) PCT No.: PCT/JP2019/012365
§ 371 (c)(1),
(2) Date: Jun. 8, 2020

(87) PCT Pub. No.: WO2019/188904
PCT Pub. Date: Oct. 3, 2019

(65) Prior Publication Data
US 2020/0393399 A1    Dec. 17, 2020

(30) Foreign Application Priority Data

Mar. 30, 2018   (JP) .................. 2018-069317

(51) Int. Cl.
*G01N 27/22* (2006.01)
(52) U.S. Cl.
CPC ................... *G01N 27/225* (2013.01)

(58) Field of Classification Search
CPC .... G01N 27/225; G01N 27/22; G01N 27/223; G01N 27/227; G01K 7/34; G02B 1/04;
(Continued)

(56) References Cited

U.S. PATENT DOCUMENTS

2003/0002238 A1* 1/2003 Toyoda ................ G01N 27/225
                                                    361/302
2010/0289762 A1   11/2010 Ito et al.
(Continued)

FOREIGN PATENT DOCUMENTS

CN    101874275 A    10/2010
CN    102998345 A    3/2013
(Continued)

OTHER PUBLICATIONS

JIS B 0601, Surface Roughness, 1994 (Year: 1994).*
(Continued)

*Primary Examiner* — Harshad R Patel
*Assistant Examiner* — Gedeon M Kidanu
(74) *Attorney, Agent, or Firm* — Foley & Lardner LLP (57) ABSTRACT

A sensor including a detection film formed from a resin composition, a first electrode provided on a first surface of the detection film, and a second electrode provided on a second surface of the detection film, wherein the first surface of the detection film includes a rough surface having fine irregularities with a root mean square roughness (Rq) of 0.3 μm to 3.0 μm in a portion that is in contact with the first electrode.

15 Claims, 5 Drawing Sheets

(58) Field of Classification Search
CPC . G02B 1/14; G02B 5/3033; H01L 2251/5315; H01L 2251/5353; H01L 51/5012; H01L 51/5209; H01L 51/5262; H01L 51/5275
See application file for complete search history.

(56) References Cited

U.S. PATENT DOCUMENTS

| | | | |
|---|---|---|---|
| 2013/0063163 A1 * | 3/2013 | Sim | G01N 27/22 324/663 |
| 2013/0207673 A1 | 8/2013 | Tondokoro et al. | |
| 2014/0339165 A1 | 11/2014 | Han et al. | |

FOREIGN PATENT DOCUMENTS

| | | | | |
|---|---|---|---|---|
| CN | 103154715 A | | 6/2013 | |
| CN | 104147940 A | | 11/2014 | |
| CN | 109557145 A | * | 4/2019 | G01N 27/225 |
| JP | S58-96722 A | | 6/1983 | |
| JP | S62-217153 A | | 9/1987 | |
| JP | 2001-249099 A | | 9/2001 | |
| JP | 2004-037405 A | | 2/2004 | |
| JP | 3821956 B2 | * | 9/2006 | |
| JP | 2007-248409 A | | 9/2007 | |
| JP | 2009-019964 A | | 1/2009 | |
| JP | 2009080100 | * | 4/2009 | |
| JP | 2011-247725 A | | 12/2011 | |
| JP | 2012-042342 A | | 3/2012 | |
| JP | 2013-057616 A | | 3/2013 | |
| JP | 6201025 B1 | * | 9/2017 | G02B 1/04 |
| KR | 20130028650 A | | 3/2013 | |
| TW | 201331254 A | | 8/2013 | |
| TW | 202131034 A | * | 8/2021 | G02B 1/04 |
| WO | WO-01/88523 A | | 11/2001 | |
| WO | WO-2010093030 A1 | * | 8/2010 | G02B 5/02 |
| WO | WO-2013088904 A1 | * | 6/2013 | H01L 51/5012 |
| WO | WO-2014/030129 A1 | | 2/2014 | |
| WO | WO-2016194874 A1 | * | 12/2016 | G01N 21/8806 |
| WO | WO-2018070247 A1 | * | 4/2018 | G02B 1/04 |

OTHER PUBLICATIONS

International Searching Authority, "International Search Report," issued in connection with International Patent Application No. PCT/JP2019/012365, dated Apr. 16, 2019.
International Searching Authority, "Written Opinion," issued in connection with International Patent Application No. PCT/JP2019/012365, dated Apr. 16, 2019.
Office Action issued in corresponding Taiwanese Patent Application No. 201942571A dated Jul. 6, 2022.
Office Action issued in corresponding Japanese Patent Application No. 2019-184594A, dated Oct. 25, 2022.
Office Action issued in corresponding Japanese Patent Application No. 2019-058500, dated Jan. 10, 2023.
Office Action issued in corresponding Chinese Patent Application No. 201980022340.5, dated Dec. 28, 2022.
Office Action issued in corresponding Chinese Patent Application 201980022340.5, dated May 20, 2023.
Office Action issued in corresponding Korean Patent Application No. 10-2020-7030934 dated Sep. 6, 2023 (13 pages).
Office Action issued in Chinese Patent Application No. 201980022340.5, dated Sep. 15, 2023.

* cited by examiner

SENSOR AND PRODUCTION METHOD FOR SAME

CROSS-REFERENCE TO RELATED APPLICATIONS

The present application claims priority under 37 U.S.C. § 371 to International Patent Application No. PCT/JP2019/012365, filed Mar. 25, 2019, which claims priority to and the benefit of Japanese Patent Application No. 2018-069317, filed on Mar. 30, 2018. The contents of these applications are hereby incorporated by reference in their entireties.

TECHNICAL FIELD

The present invention relates to a sensor and a production method for the same.

BACKGROUND ART

Generally, a sensor is a device that reads a change in a physical property caused by an external stimulus on a detection film as an electric signal. Various kinds of detection films are used depending on the substance to be measured. For example, it is known that humidity sensors read a change in capacitance caused by a change in humidity. As such a humidity sensor, a capacitance type humidity sensor including a moisture-sensitive film formed from a resin composition is known. For example, Patent Literature 1 (Japanese Patent Laid-Open No. 2001-249099) discloses a capacitance type humidity sensor including a moisture-sensitive film that uses an organic compound having a hydrophilic group.

A moisture-sensitive film formed from a resin composition can adsorb and desorb moisture included in an ambient atmosphere. In a capacitance type humidity sensor, the capacitance of the moisture-sensitive film is measured by applying a voltage between two electrodes arranged on either side of the moisture-sensitive film, the amount of moisture adsorbed by the moisture-sensitive film is calculated based on the measured value, and the humidity of the ambient atmosphere is calculated.

CITATION LIST

Patent Literature

Patent Literature 1: Japanese Patent Laid-Open No. 2001-249099

SUMMARY OF INVENTION

Technical Problem

For a sensor to carry out stable sensing, it is important for the sensor to always be able to stably read an electric signal produced by a change in a physical property of the detection film. Even when used for a prolonged period of time, it is required that measurement accuracy does not deteriorate, that is, that it is required to have good durability. For example, if a change in capacitance is read as an electric signal, it is required that the change in capacitance over time be small even when used for a prolonged period of time.

It is an object of the present invention to provide a sensor having good durability and a method for producing the sensor.

Solution to Problem

The present invention provides the following sensors and methods for producing the sensors.

[1] A sensor, comprising:
   a detection film formed from a resin composition;
   a first electrode provided on a first surface of the detection film; and
   a second electrode provided on a second surface of the detection film,
   wherein the first surface of the detection film includes a rough surface having fine irregularities with a root mean square roughness (Sq) of 0.3 µm to 3.0 µm in a portion that is in contact with the first electrode.

[2] A sensor comprising a sensor element, the sensor element including:
   a detection film formed from a resin composition;
   a first electrode provided on a first surface of the detection film; and
   a second electrode provided on a second surface of the detection film,
   wherein a surface having the first electrode of the sensor element includes a rough surface having fine irregularities with a root mean square roughness (Sq) of 0.3 µm to 3.0 µm.

[3] The sensor according to [1] or [2], wherein at least one of the first electrode and the second electrode is a plated film.

[4] The sensor according to any one of [1] to [3], wherein the first surface of the detection film includes a portion that is not in contact with the first electrode.

[5] The sensor according to any one of [1] to [4] wherein the detection film has an average thickness of µµm to 10 µm.

[6] The sensor according to any one of [1] to [5:], wherein the second surface of the detection film includes a rough surface having fine irregularities with a root mean square roughness (Sq) of 0.3 µm to 3.0 µm in a portion that is in contact with the second electrode.

[7] The sensor according to any one of [1] to [6], further comprising a substrate, wherein the substrate, the second electrode, the detection film, and the first electrode are laminated in that order.

[8] The sensor according to any one of [1] to [7], wherein the sensor has flexibility.

[9] The sensor according to any one of [1] to [8], wherein the detection film is a moisture-sensitive film.

[10] The sensor according to [9], wherein the moisture-sensitive film is formed from a resin composition containing a polyimide resin component.

[11] A method for producing a sensor, the method comprising:
   a step of providing a substrate;
   a step of forming a second electrode on the substrate;
   a step of forming on the second electrode a detection film having a resin as a main component;
   a step of roughening at least a part of the surface of the detection film opposite to the second electrode to form a rough surface; and
   a step of forming a first electrode by plating on a region including the rough surface of the surface of the detection film,
   wherein the rough surface has a root mean square roughness (Sq) of 0.3 µm to 3.0 µm.

[12] A method for producing a sensor, the method comprising:
   a step of providing a substrate;
   a step of forming a second electrode on the substrate;

a step of forming on the second electrode a detection film having a resin as a main component; and a step of forming a first electrode by plating on the surface of the detection film opposite to the second electrode, wherein the surface having the first electrode includes a rough surface having fine irregularities with a root mean square roughness (Sq) of 0.3 µm to 3.0 µm.

Advantageous Effects of Invention

According to the present invention, a sensor having good durability where changes over time in the capacitance are suppressed and the wear resistance is superior can be provided.

BRIEF DESCRIPTION OF DRAWINGS

FIGS. 1(a) and 1(b) is a schematic plan view schematically illustrating an example of a humidity sensor according to a first embodiment of the present invention.

FIGS. 2(a) and 2(b) is a schematic plan view schematically illustrating an example of a humidity sensor according to a second embodiment of the present invention.

DESCRIPTION OF EMBODIMENTS

[Sensor]

The sensor according to the present invention includes a sensor element comprising a detection film formed from a resin composition, a first electrode provided on a first surface of the detection film, and a second electrode provided on a second surface (a surface facing the first surface) of the detection film. The type of the sensor is not particularly limited as long as the sensor can read a change in physical properties of the detection film due to an external stimulus as an electric signal. The sensor may be a capacitance type, a resistance type, a voltage type, a current type, or the like. The kind of the sensor is not particularly limited, and the sensor may be a humidity sensor, a proximity sensor, a pressure sensor, an acceleration sensor, a level sensor, a strain sensor, a pyroelectric sensor, or the like.

In the sensor element, a region where the first electrode and the second electrode face each other and sandwich the detection film acts as the capacitor in a capacitance sensor, for example. A capacitance C (F) of the region acting as a capacitor (hereinafter, also referred to as a "capacitor region") satisfies the following expression, in which a dielectric constant of the capacitor region is represented as ε (F/m), its area is represented as S (m²), and film thickness is represented as d (m).

$$C = \varepsilon S/d$$

In the above expression, the capacitance C (F) changes according to the dielectric constant ε (F/m) of the capacitor region. For example, since a moisture-sensitive film (also referred to as a "detection film") used in a humidity sensor (also simply referred to as a "sensor") adsorbs and desorbs moisture according to the ambient atmosphere, the dielectric constant ε (F/m) of the capacitor region changes according to the amount of adsorbed moisture, and the detected capacitance C (F) also changes. Therefore, the humidity sensor can calculate the humidity of the ambient atmosphere by detecting changes in the capacitance C (F) in the capacitor region. Hereinafter, the capacitance of the capacitor region is sometimes simply referred to as "capacitance".

In a humidity sensor, even if the ambient atmosphere conditions are constant, the measured capacitance may change over time, and durability may deteriorate. The present inventors have found that one of the causes of this is a deterioration in wear resistance. Further, not only humidity sensors but any sensor having a sensor element sandwiching a detection film between electrodes is expected to exhibit a substantial deterioration in durability when the sensor is flexible. This is because it is expected that the frequency with which a frictional force applied to each layer of the sensor element increases according to the frequency with which a bending force is applied to the sensor.

The present inventors conducted further diligent studies and found that a sensor having good durability can be obtained by employing a configuration including a rough surface having fine irregularities (hereinafter, also referred to as a "first rough surface") in a portion that is in contact with the first electrode on the first surface of the detection film, thereby completing the present invention. In particular, the present inventors found that in a capacitance type sensor, by providing at least one of the first rough surface and a second rough surface to be described later, it is possible to suppress changes over time in the capacitance when the ambient atmosphere conditions are constant.

The change over time in capacitance can be evaluated, for example, by measuring the capacitance retention rate by the following method. First, a humidity sensor test piece is conditioned by leaving it to stand in an ordinary temperature and ordinary humidity (for example, temperature of about 20±15° C. and relative humidity of about 40 to 60% RH) environment, and the capacitance is measured with a commercially available capacitance meter. This capacitance is taken as an initial capacitance Co. Next, the humidity sensor test piece is subjected to a wear resistance test to be described later, the humidity sensor after the wear resistance test is similarly conditioned in the same ordinary temperature and ordinary humidity environment, and the capacitance is measured. This capacitance is taken as a capacitance $C_1$. Using these capacitances, the capacitance retention rate (%) is calculated based on the following expression. In the examples described below, the conditioning was carried out for about 1 hour under an atmosphere having a temperature of 30° C. and a relative humidity of 60% RH.

Capacitance retention rate (%)=($C_1/C_0$)×100

The capacitance retention rate is preferably 50% or more, and more preferably 60% or more, further preferably 70% or more, and especially preferably 80% or more. If the capacitance retention rate is in the above range, change over time in the capacitance tends to be suppressed.

The wear resistance test performed on the humidity sensor test piece can be performed by the following method.

Figure 3A:
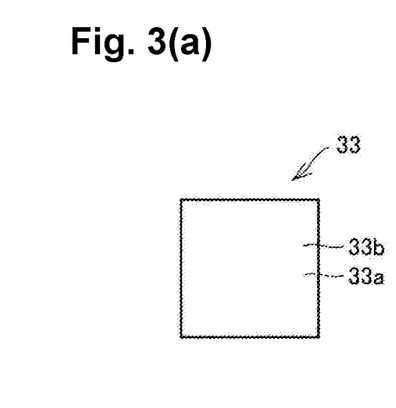
FIGS. 3(a), 3(b), 3(c), 3(d), 3(e), 3(f), 3(g), and 3(h) are schematic plan views schematically illustrating a procedure for producing a test piece of a humidity sensor in examples and comparative examples.
Figure 3B:
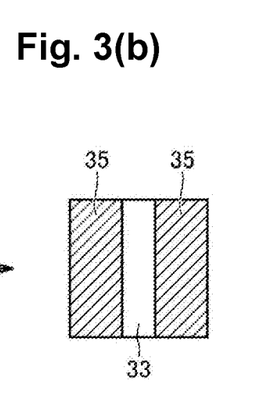
Figure 3C:
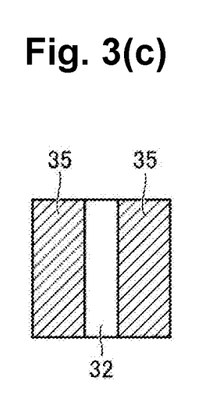
Figure 3D:
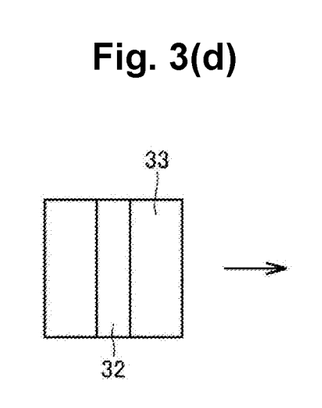
Figure 3E:
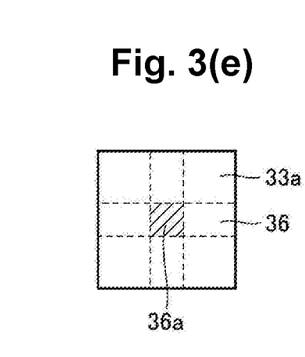
Figure 3F:
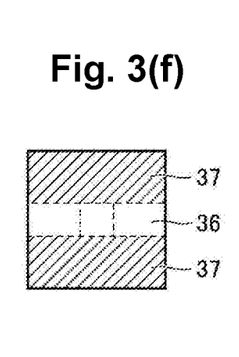
Figure 3G:
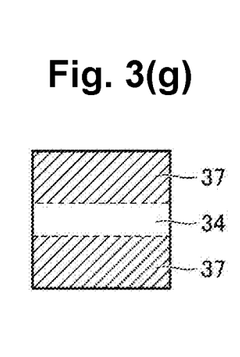
Figure 3H:
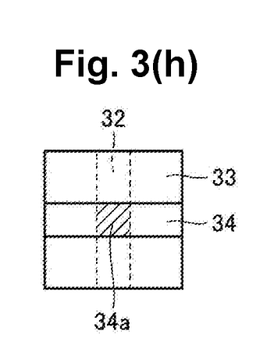

As illustrated in FIG. 3(h), the wear test is carried out with a commercially available friction wear tester on a region 1 cm wide×2 cm long of the humidity sensor test piece centered on the region 34a of the surface of the upper electrode 34. The test is carried out by placing a commercially available non-woven fabric wiper on a contact surface between the contact terminal of the instrument and the upper electrode, setting the movement speed and the vertical load to the desired conditions, and moving the contact terminal back and forth. In the examples described below, a "Tribogear TYPE 38" manufactured by Shinto Scientific Co., Ltd. is used as the friction wear tester, and the contact terminal is moved back and forth 100 times under conditions of a moving speed of 1600 mm/min and a vertical load of 30 g.

<Detection Film>

The detection film may include a first rough surface having fine irregularities in a portion that is in contact with the first electrode on the first surface. From the viewpoint of improving wear resistance, the fine irregularities of the first rough surface on the first surface of the detection film have a root mean square roughness (Sq) of preferably 0.3 μm to 3.0 μm, more preferably 0.5 μm to 2.5 μm, and further preferably 0.6 μm to 1.5 μm. The root mean square roughness (Sq) is a three-dimensional extension of the root mean square roughness (Rq) of the two-dimensional contour curve described in JIS B 0601.

By employing a configuration having the first rough surface in a portion that is in contact with the first electrode on the first surface of the detection film, it is presumed that the wear resistance of the sensor can be improved, and as a result, durability can be improved. In the case that the detection film of the sensor has the first rough surface, the detection film may also have a second rough surface to be described later on the surface of the detection film opposite to the first electrode in the sensor.

The first rough surface on the first surface of the detection film may be the entire first surface or a part of the first surface, as long as it includes a portion that is in contact with the first electrode. It is preferable that the first rough surface includes the capacitor region, preferably 50% or more of the capacitor region, and more preferably 100% of the capacitor region.

Similar to the portion that is in contact with the first electrode on the first surface, a portion that is in contact with the second electrode on the second surface of the detection film may also be configured to include a rough surface having fine irregularities (hereinafter, also referred to as a "third rough surface"). With such a configuration, better durability of the sensor can be obtained. Further, for a capacitance type sensor, it is possible to further suppress changes over time in the capacitance. The fine irregularities of the third rough surface on the second surface of the detection film have a root mean square roughness (Sq) of preferably 0.3 μm to 3.0 μm, more preferably 0.5 μm to 2.5 μm, and further preferably 0.6 μm to 1.5 μm.

In the detection film, the method for forming the first rough surface and the third rough surface described above are not particularly limited, and a known method is employed. Examples thereof include a method of abrading the surface by sandblasting, liquid honing, buffing, mechanical abrasion as abrading with an abrasive sheet (lapping film, etc.), and the like. Alternatively, when forming the detection film, a detection film having the first rough surface and the third rough surface may be formed. Specifically, for example, when forming the detection film, a method in which the rough surfaces are transferred or a method in which the rough surfaces are formed by adding fine particles to a composition to be used to form the detection film and projecting the fine particles from the surface may be employed. The detection film can be formed by a known method, such as a solution casting method using a solution including a resin composition and a solvent, and a melt extrusion method. As an application method, a known application method may be employed, such as a spin coating method, a screen printing method, an inkjet printing method, a dip coating method, an air knife coating method, a roll coating method, a gravure coating method, or a blade coating method.

The detection film preferably has an average thickness of 0.3 μm or more, and may be 0.5 μm or more, and may be 90 μm or less, may be 50 μm or less, is preferably 10 μm or less, more preferably 3 μm or less, and further preferably 1 μm or less.

The detection film is formed from a resin composition. The resin composition contains a resin, and may also include additives such as an antioxidant, a flame retardant, a plasticizer, and an ultraviolet absorber. The resin forming the detection film is not particularly limited. When the detection film is a moisture-sensitive film, the resin is not limited as long as it is a resin capable of adsorbing and desorbing moisture. Examples thereof include a polyimide resin, a cellulose resin, and a polyvinyl alcohol resin. From the viewpoint of having excellent durability, a polyimide resin is preferable. The content of the polyimide resin component in the resin composition is, based on the total amount of the resin composition, preferably 90% by mass or more, more preferably 95% by mass or more, further preferably 98% by mass or more, and may be 100% by mass. The "total amount of the resin composition" means the solid component included in the resin composition, and is the total amount of components other than the solvent.

The polyimide resin component includes one or more kinds of polyimide resin, and preferably includes at least a fluorinated polyimide resin. Here, "polyimide resin component contained by the resin composition" refers to the polyimide resin included in the resin composition. That is, when the polyimide resin component includes one kind of polyimide resin, "the polyimide resin component contained by the resin composition" means that one kind of polyimide resin, and when the polyimide resin component includes two or more kinds of polyimide resin, "the polyimide resin component contained by the resin composition" means those two or more kinds of polyimide resin.

By including the fluorinated polyimide resin, excellent responsiveness to moisture adsorption and desorption can be obtained in the moisture-sensitive film. The fluorinated polyimide resin is not particularly limited as long as it is a resin having a polyimide structure and a fluoro group (i.e., a fluorine atom). The polyimide resin can be obtained, for example, by reacting a diamine or derivative thereof with a tetracarboxylic acid or derivative thereof. Examples of the polyimide resin that can be used for the moisture-sensitive film include the resins described in International Publication No. WO 2017/179367.

<First Electrode>

The first electrode can be formed using a conductive material. The first electrode can be formed from one or more selected from the group consisting of, for example, metals such as gold, copper, aluminum, iron, tin, zinc, nickel, titanium, molybdenum, chromium, tungsten and lead, and an alloy including two or more metals selected from among those metals, aluminum-silicon alloys, and polycrystalline silicon. The first electrode can be formed on the first surface of the detection film by a known plating method such as electrolytic plating, electroless plating, hot dip plating, chemical vapor deposition, and physical vapor deposition, a method of laminating an electrode film formed in advance on the first surface, or the like. Examples of physical vapor deposition include evaporation systems including a method of heating and vaporizing an evaporation source, such as vacuum vapor deposition, molecular beam vapor deposition, and ion beam vapor deposition, and sputtering systems such as magnetron sputtering and ion beam sputtering. These methods can combine patterning as needed. A plating method is preferable because high adhesion with the first surface can be obtained. In this specification, a film formed by a plating method is referred to as a plated film.

The thickness of the first electrode is preferably 100 nm to 500 nm, and more preferably 100 nm to 300 nm. In the case that the sensor is a humidity sensor and the surface exposed to the external environment when the sensor is installed at an arbitrary position is the surface on the first electrode side (i.e., the installation surface of the sensor is not the surface on the first electrode side), the thickness of the first electrode is preferably thin so that moisture can be taken in from the surface of the first electrode.

<Surface Having First Electrode of Sensor Element>

The surface having the first electrode of the sensor element may include a rough surface having fine irregularities (also referred to as a "second rough surface"). The surface having the first electrode of the sensor element includes the surface opposite to the detection film side of the first electrode. The second rough surface on the surface having the first electrode of the sensor element has a root mean square roughness (Sq) of preferably 0.3 μm to 3.0 μm, more preferably 0.5 μm to 2.5 μm, and further preferably 0.6 μm to 1.5 μm.

The second rough surface on the surface having the first electrode of the sensor element may be the entire surface of the portion where the first electrode is provided, or may be a part of that surface. It is preferable that the second rough surface include the capacitor region, preferably 50% or more of the capacitor region, and more preferably 100% of the capacitor region.

The second rough surface on the surface having the first electrode of the sensor element can be formed having a shape that follows the shape of the first surface of the detection film by forming the first rough surface described above on the first surface of the detection film, and can include a shape formed tracking the shape of the first rough surface. The shape of the first rough surface and the shape of the second rough surface may or may not be the same as each other.

<Second Electrode>

The second electrode can be formed using a conductive material. For example, the second electrode can be formed using the materials exemplified for the first electrode. The second electrode may be directly formed on the second surface of the detection film, or may be formed on a substrate and then laminated on the second surface of the detection film. The second electrode can be formed by the formation methods exemplified for the first electrode.

The thickness of the second electrode is not particularly limited, and may be the same as the thickness of the first electrode or may be thicker than the thickness of the first electrode. The thickness of the second electrode may be, for example, 100 nm to 500 nm, or 100 nm to 300 nm.

<Surface Having Second Electrode of Sensor Element>

Similar to the surface of the first electrode side of the sensor element, the surface having the second electrode of the sensor element may include a rough surface having fine irregularities (hereinafter, also referred to as a "fourth rough surface"). The surface having the second electrode of the sensor element includes the surface opposite to the detection film side of the second electrode. The fourth rough surface on the surface having the second electrode of the sensor element has a root mean square roughness (Sq) of preferably 0.3 μm to 3.0 μm, more preferably 0.5 μm to 2.5 μm, and further preferably 0.6 μm to 1.5 μm.

The fourth rough surface on the surface having the second electrode of the sensor element can be formed in the same manner as the second rough surface, and for example can be formed having a shape that follows the shape of the third surface of the detection film by forming the third rough surface described above on the third rough surface of the detection film, and may be a shape formed tracking the shape of the third rough surface. The shape of the third rough surface and the shape of the fourth rough surface may or may not be the same as each other.

<Applications>

The sensor of the present invention can be used in known applications, and is not particularly limited as to how it is used. Although the sensor can be mounted without distinguishing between the surface on the first electrode side and the surface on the second electrode side, it is preferable to mount the sensor such that, of the first electrode and the second electrode, the exposed surface of the sensor (opposite side to the installation surface of the sensor) is the surface of the first electrode side. Examples of applications include mounting on a portable device, such as a smartphone or a wristwatch type mobile terminal. The sensor may be configured to be flexible, depending on its application. When the sensor is mounted on the portable device, the detected humidity may be applied in controlling the portable device.

There is now specifically described an example of a case in which the sensor according to the present invention is a humidity sensor and the detection film is a moisture-sensitive film.

First Embodiment

Figure 1A:
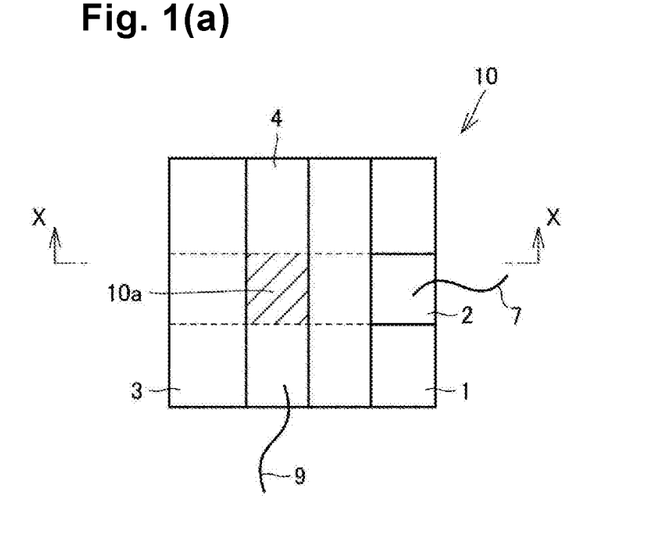
Figure 1B:
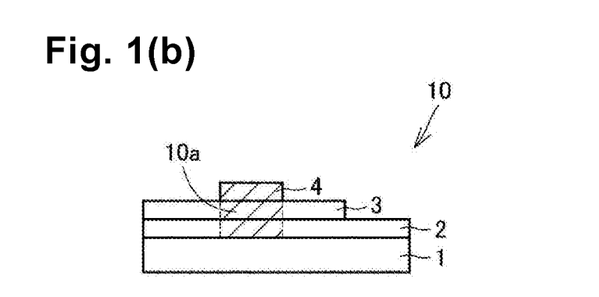
FIG. 1(b) is a cross-sectional view taken along the line X-X of FIG. 1(a).

FIG. 1(a) is a schematic plan view schematically illustrating a first embodiment of the humidity sensor, and FIG. 1(b) is a cross-sectional view taken along the line X-X of FIG. 1(a). As illustrated in FIGS. 1(a) and 1(b), a humidity sensor (sensor) 10 includes an insulating substrate 1, a lower electrode (second electrode) 2, a moisture-sensitive film (detection film) 3, an upper electrode (first electrode) 4, a lower electrode lead wire 7, and an upper electrode lead wire 9. The lower electrode 2 is formed on the insulating substrate 1, and the lower electrode lead wire 7 is connected to the lower electrode 2. The moisture-sensitive film 3 is formed on the insulating substrate 1 so as to cover a region other than the portion connecting with the lower electrode lead wire 7 of the lower electrode 2. The upper electrode 4 is formed on the moisture-sensitive film 3 so as to extend in a direction orthogonal to the direction in which the lower electrode 2 extends. The upper electrode lead wire 9 is connected to the upper electrode 4.

In the humidity sensor 10, the region where the upper electrode 4 and the lower electrode 2 face each other is a capacitor region 10a. On the surface of the moisture-sensitive film 3 on which the upper electrode 4 is provided (first surface), the surface in contact with the upper electrode 4 is the rough surface described above.

The insulating substrate 1 may be a glass substrate having insulating properties, a metal oxide substrate formed of a metal oxide such as aluminum oxide or silicon oxide, or a substrate formed by covering the surface of a conductive substrate with an insulating material such as a metal oxide.

An example of a method for producing the humidity sensor 10 is now described. First, the insulating substrate 1 is prepared. Next, the lower electrode 2 is formed on the insulating substrate 1. The lower electrode 2 may be formed, for example, by depositing an electrode material on the entire surface of the insulating substrate 1 and patterning the surface into a desired shape using a photolithography technique, or by applying a mask on the insulating substrate 1, and then simultaneously depositing and patterning the electrode material. Next, the moisture-sensitive film 3 is formed on the insulating substrate 1 on which the lower electrode 2 has been formed. The moisture-sensitive film 3 can be formed by applying a coating liquid including a resin composition and a solvent onto the insulating substrate 1, and then drying (solution casting method). When applying the coating liquid, it is preferable to apply the coating liquid by masking or the like the portion connecting with the lower electrode lead wire 7 on the lower electrode 2.

Next, a region on the upper surface of the moisture-sensitive film 3 where the upper electrode 4 is to be formed is abraded to form a rough surface. Next, the upper electrode 4 is formed on the upper surface of the moisture-sensitive film 3. The upper electrode 4 can be formed by the same method as the lower electrode 2.

Second Embodiment

Figure 2A:
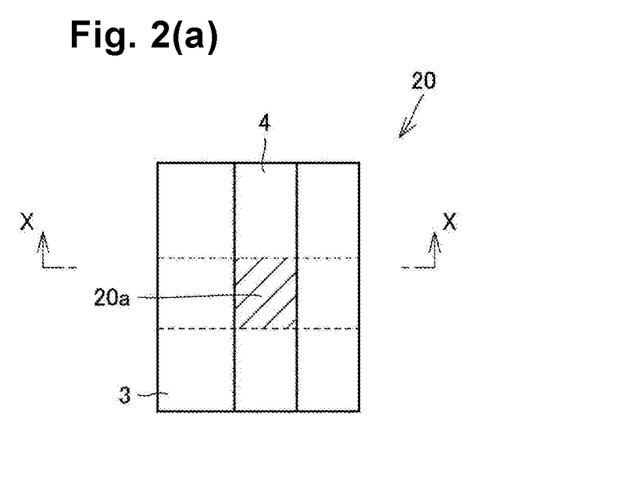
Figure 2B:
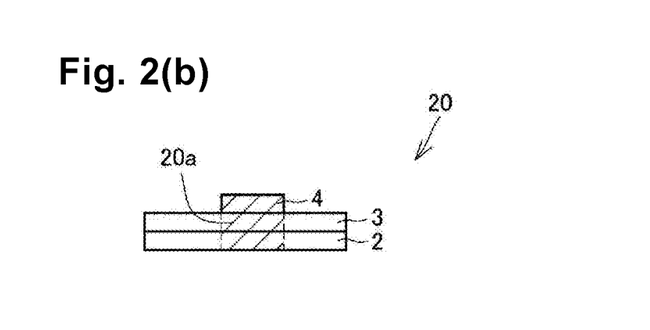
FIG. 2(b) is a cross-sectional view taken along the line X-X of FIG. 2(a).

FIG. 2(a) is a schematic plan view schematically illustrating a second embodiment of the humidity sensor, and FIG. 2(b) is a cross-sectional view taken along the line X-X of FIG. 2(a). As illustrated in FIGS. 2(a) and 2(b), the humidity sensor 20 differs from the humidity sensor 10 of the first embodiment only in that it does not have the insulating substrate 1. Since the humidity sensor 20 does not have the insulating substrate 1, the lower electrode 2 can be configured by directly providing on the surface (second surface) of the moisture-sensitive film 3 formed in advance. The region where the upper electrode 4 and the lower electrode 2 face each other is a capacitor region 20a.

Although the lower electrode lead wire and the upper electrode lead wire are not shown in FIGS. 2(a) and 2(b), those parts may be provided as appropriate.

Although the form of the upper electrode and the lower electrode of the sensor according to the present invention is not limited to a form in which the upper electrode and the lower electrode are orthogonal to each other like in the humidity sensors of the first and second embodiments, from the viewpoint of being able to improve measurement accuracy, it is preferable that at least a part of the surface of the moisture-sensitive film is exposed to the ambient environment without being covered by the electrodes.

EXAMPLES

The present invention will now be described more specifically with reference to examples and comparative examples, but the present invention is not limited to these examples and comparative examples.
[Durability Evaluation Method]

The capacity retention rate of each humidity sensor test piece of the examples and comparative examples was evaluated as follows. First, the humidity sensor test piece was conditioned for about 1 hour in an atmosphere having a temperature of 30° C. and a relative humidity of 60% RH, and then a capacitance meter (trade name: Compact Capacitance Meter Model 810C, manufactured by BK Precision) was used to measure the capacitance. The capacitance measured at this time was taken as the initial capacitance $C_0$.

Next, the humidity sensor test pieces of the examples and comparative examples were subjected to the following wear resistance test. The humidity sensors after the wear resistance test were conditioned for about 1 hour in an atmosphere having a temperature of 30° C. and a relative humidity of 60% RH. Then, the capacitance was measured using a capacitance meter (trade name: Compact Capacitance Meter Model 810C, manufactured by BK Precision). The capacitance measured at this time was taken as the capacitance $C_1$.

Then, the capacity retention rate (%) was calculated based on the following expression.

$$\text{Capacitance retention rate (\%)} = (C_1/C_0) \times 100$$

Production Example 1

(Production of Polyimide Resin Film)

Based on the description in Example 1 of International Publication No. WO 2017/179367, 2,2'-bis(trifluoromethyl)-4,4'-diaminophenyl and 4,4'-(1,1,1,3,3,3-hexafluoropropane-2,2-diyl)diphthalic dianhydride were reacted to synthesize a polyimide resin. The obtained polyimide resin was dissolved in γ-butyrolactone at 20% by mass to obtain a uniform polyimide solution. The obtained solution was applied on a glass substrate and heated at 50° C. for 30 minutes and then at 140° C. for 10 minutes to dry the solvent. The film was peeled from the glass substrate, a metal frame was mounted, and the film was heated at 210° C. for 1 hour to obtain an 80 μm polyimide resin film.

Examples 1 to 5 and Comparative Example 1

(Production of Humidity Sensor Test Piece)

A test piece of a humidity sensor having the same configuration as the humidity sensor of the second embodiment was produced by the procedure illustrated in FIGS. 3(a) to 3(h). Specifically, as illustrated in FIG. 3(a), a film 33 was prepared as a moisture-sensitive film by cutting the polyimide resin film obtained above in Production Example 1 into a 5 cm square size. Then, as illustrated in FIG. 3(b), on a second surface 33b of the film 33, a region having a width of 1 cm extending in one direction was exposed as a center, and a tape 35 was adhered to mask the second surface 33b. Next, as illustrated in FIG. 3(c), vapor deposition was carried out on the second surface 33b of the film 33 for 10 minutes by using an ion coater IB-3 (manufactured by Eicoh Co., Ltd.) with a vapor deposition source of Au under vapor deposition conditions of 5 to 8 mA to form a lower electrode 32. Then, as illustrated in FIG. 3(d), the mask tape 35 was peeled off, whereby the film 33 was obtained having the lower electrode 32 with a size of 1 cm×5 cm corresponding to the exposed region formed on the second surface 33b.

Next, as illustrated in FIG. 3(e), a lapping film (thickness: 3 μm, abrasive grains: aluminum oxide (grain size 12 μm), manufactured by 3M Co., Ltd.) was moved back and forth for the predetermined number of times shown in Table 1 across a region 36 having a width of 1 cm extending in a direction orthogonal to the lower electrode 32 to abrade the first surface 33 a of the film 33. After the abrasion treatment, the surface roughness $S_1$ (μm) of a 1 cm×1 cm region 36a of the region 36 facing the lower electrode 32 was measured with a surface roughness measuring instrument (OLS 4100, manufactured by OLYMPUS CORPORATION) at a measurement magnification of ×10 to measure a 1280 µm×1280 µm measurement area. The surface roughness $S_1$ (µm) was the value of the root mean square roughness (Sq).

Next, as illustrated in FIG. 3(f), on the first surface 33a of the film 33, a tape 37 was adhered to the film to mask the first surface 33a. Next, as illustrated in FIG. 3(g), vapor deposition was carried out on the first surface 33a of the film 33 for 5 minutes by using an ion coater IB-3 (manufactured by Eicoh Co., Ltd.) with a vapor deposition source of Au under vapor deposition conditions of 5 to 8 mA to form an upper electrode. Then, as illustrated in FIG. 3(h), the mask tape 37 was peeled off, whereby the film 33 was obtained having the upper electrode 34 with a size of 1 cm×5 cm corresponding to the exposed region 36 formed on the first surface 33a. Then, the surface roughness $S_2$ (µm) of a region 34a of the upper electrode 34 surface facing the lower electrode 32 was measured with a surface roughness measuring instrument (OLS 4100, manufactured by OLYMPUS CORPORATION) at a measurement magnification of ×10 to measure a 1280 µm×1280 µm measurement area. The surface roughness $S_2$ (µm) was the value of the root mean square roughness (Sq).

(Wear Resistance Test)

The wear resistance of each humidity sensor test piece of the examples and comparative examples was evaluated by placing a non-woven fabric wiper (BEMCOTM-1, manufactured by Asahi Kasei Corporation) on a contact surface between a contact terminal and the upper electrode and moving the contact terminal back and forth 100 times across a 1 cm width×2 cm length region centered on the region 34a (FIG. 3(h)) on the upper electrode 34 surface by using a friction wear tester (trade name: Tribogear TYPE 38, manufactured by Shinto Scientific Co., Ltd.) at a moving speed of 1600 ram/min under a vertical load of 30 g.

[Durability Evaluation Results]

Figure 4:
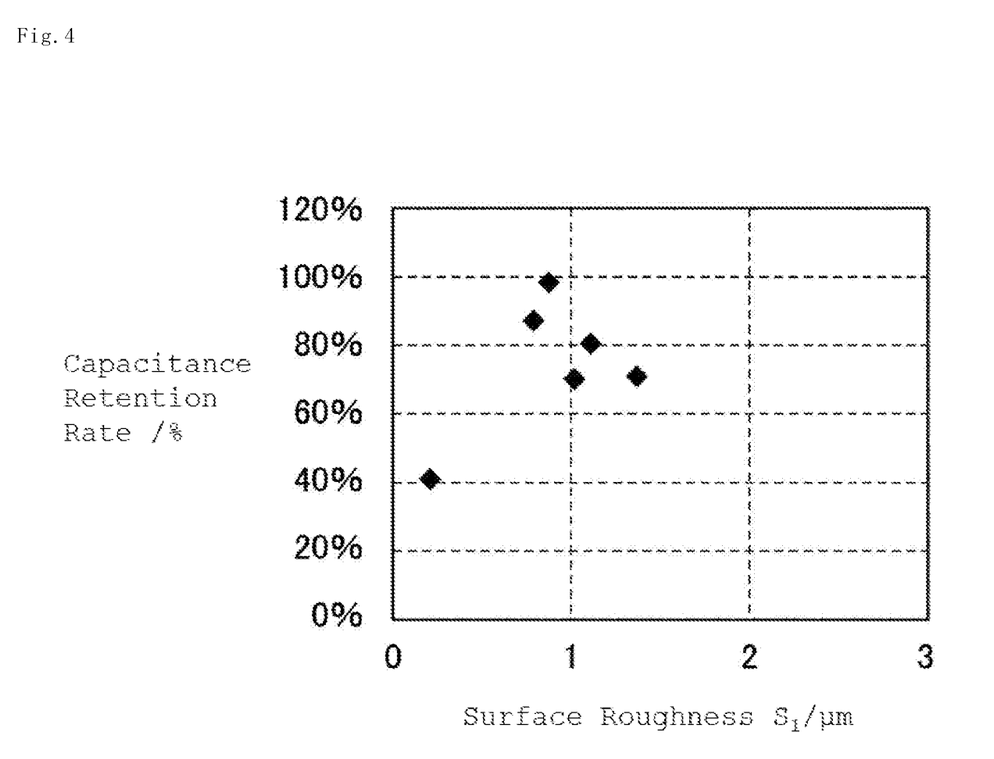
FIG. 4 is a graph plotting the humidity sensor test pieces of the examples and comparative examples, with a surface roughness $S_1$ (µm) of a first surface of a moisture-sensitive film on the horizontal axis and a capacitance retention rate (%) on the vertical axis.
Figure 5:
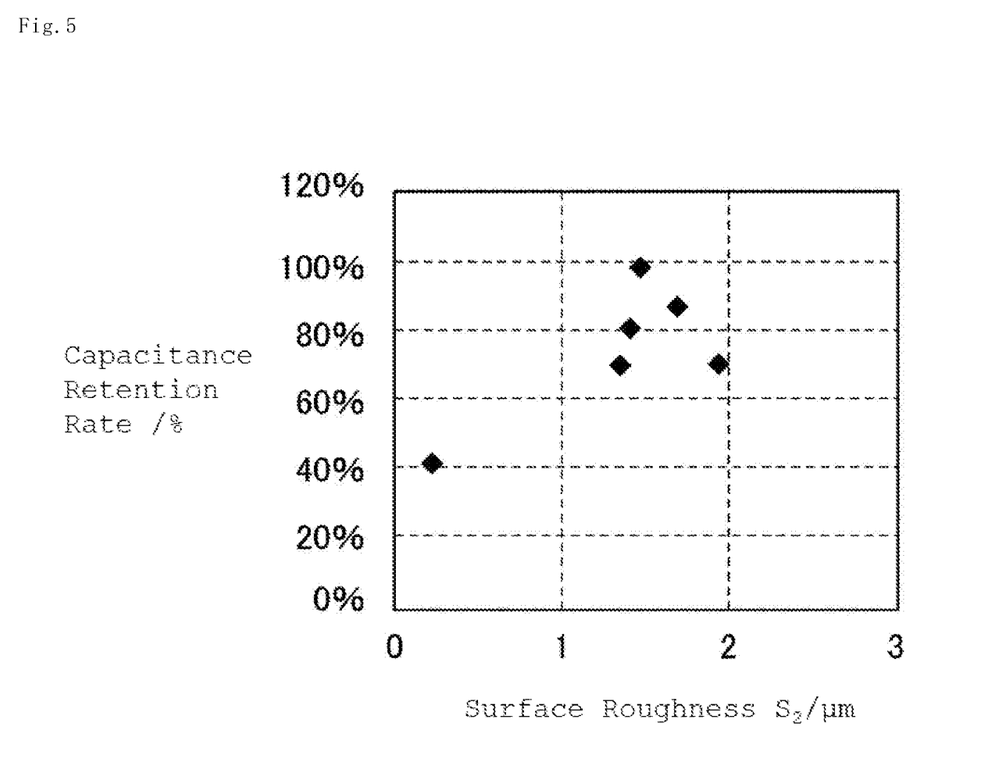
FIG. 5 is a graph plotting the humidity sensor test pieces of the examples and comparative examples, with a surface roughness $S_2$ (µm) of an upper electrode on the horizontal axis and a capacitance retention rate (%) on the vertical axis.

The surface roughness $S_1$ (µm) of the first surface of the moisture-sensitive film, the surface roughness $S_2$ (µm) of the upper electrode, and the capacity retention rate (%) measured as described above for each humidity sensor test piece of the examples and comparative examples are shown in Table 1. Further, FIG. 4 is a graph plotting the results shown in Table 1 with the surface roughness $S_1$ (µm) of the first surface of the moisture-sensitive film on the horizontal axis and the capacitance retention rate (%) on the vertical axis. FIG. 5 is a graph plotting the results shown in Table 1 with the surface roughness S2 (µm) of the upper electrode on the horizontal axis and the capacitance retention rate (%) on the vertical axis.

REFERENCE SIGNS LIST 1 insulating substrate
2, 32 lower electrode
3, 33 moisture-sensitive film
4, 34 upper electrode
7 lower electrode lead wire
9 upper electrode lead wire
10 moisture-sensitive sensor
20 moisture-sensitive sensor
33a first surface (of moisture-sensitive film)
33b second surface (of moisture-sensitive film)

The invention claimed is:

1. A sensor, comprising:
a detection film formed from a resin composition;
a first electrode provided on a first surface of the detection film; and
a second electrode provided on a second surface of the detection film,
wherein the first surface of the detection film includes a rough surface having fine irregularities with a root mean square roughness (Sq) of 0.5 µm to 2.5 µm in a portion that is in contact with the first electrode,
wherein the rough surface is on a side of the sensor exposed to an external environment,
wherein the sensor has flexibility,
wherein the detection film is a moisture-sensitive film, and
wherein the moisture-sensitive film is formed from a resin composition containing a polyimide resin component.

2. The sensor according to claim 1, wherein at least one of the first electrode and the second electrode is a plated film.

3. The sensor according to claim 1, wherein the first surface of the detection film includes a portion that is not in contact with the first electrode.

4. The sensor according to claim 1, wherein the detection film has an average thickness of 0.3 µm to 10 µm.

5. The sensor according to claim 1, wherein the second surface of the detection film includes a rough surface having fine irregularities with a root mean square roughness (Sq) of 0.3 µm to 3.0 µm in a portion that is in contact with the second electrode.

6. The sensor according to claim 1, further comprising a substrate, wherein the substrate, the second electrode, the detection film, and the first electrode are laminated in that order.

TABLE 1

| | | Example 1 | Example 2 | Example 3 | Example 4 | Example 5 | Comparative Example 1 |
|---|---|---|---|---|---|---|---|
| Number of Times Abrasion Performed on Moisture-Sensitive Film (times) | | 10 | 30 | 50 | 100 | 300 | 0 |
| Surface Roughness ($S_q$) | Moisture-Sensitive Film Surface $S_1$ (µm) | 1.37 | 0.79 | 1.01 | 0.88 | 1.10 | 0.21 |
| | Upper Electrode Surface $S_2$ (µm) | 1.94 | 1.69 | 1.35 | 1.47 | 1.41 | 0.22 |
| Capacitance Retention Rate (%) | | 70 | 87 | 70 | 98 | 80 | 41 |

7. The sensor according to claim 1, wherein a thickness of the first electrode is 100 nm to 300 nm.

8. The sensor according to claim 1, wherein the root mean square roughness (Sq) from 0.6 μm to 1.5 μm.

9. A sensor comprising a sensor element, the sensor element including:
- a detection film formed from a resin composition;
- a first electrode provided on a first surface of the detection film; and
- a second electrode provided on a second surface of the detection film,
- wherein a surface having the first electrode of the sensor element includes a rough surface having fine irregularities with a root mean square roughness (Sq) of 0.5 μm to 2.5 μm, wherein the rough surface is on a side of the sensor exposed to an external environment,
- wherein the sensor has flexibility,
- wherein the detection film is a moisture-sensitive film, and
- wherein the moisture-sensitive film is formed from a resin composition containing a polyimide resin component.

10. The sensor according to claim 9, wherein a thickness of the first electrode is 100 nm to 300 nm.

11. The sensor according to claim 9, wherein the root mean square roughness (Sq) from 0.6 μm to 1.5 μm.

12. A method for producing a sensor, the method comprising:
- a step of providing a substrate;
- a step of forming a second electrode on the substrate;
- a step of forming on the second electrode a detection film having a resin as a main component;
- a step of roughening at least a part of the surface of the detection film opposite to the second electrode to form a rough surface; and
- a step of forming a first electrode by plating on a region including the rough surface of the surface of the detection film,
- wherein the rough surface has a root mean square roughness (Sq) of 0.5 μm to 2.5 μm, wherein the rough surface is on a side of the sensor exposed to an external environment
- wherein the sensor has flexibility,
- wherein the detection film is a moisture-sensitive film, and
- wherein the moisture-sensitive film is formed from a resin composition containing a polyimide resin component.

13. The method according to claim 12, wherein the root mean square roughness (Sq) from 0.6 μm to 1.5 μm.

14. A method for producing a sensor, the method comprising:
- a step of providing a substrate;
- a step of forming a second electrode on the substrate;
- a step of forming on the second electrode a detection film having a resin as a main component; and
- a step of forming a first electrode by plating on the surface of the detection film opposite to the second electrode,
- wherein the surface having the first electrode includes a rough surface having fine irregularities with a root mean square roughness (Sq) of 0.5 μm to 2.5 μm, wherein the rough surface is on a side of the sensor exposed to an external environment,
- wherein the sensor has flexibility,
- wherein the detection film is a moisture-sensitive film, and
- wherein the moisture-sensitive film is formed from a resin composition containing a polyimide resin component.

15. The method according to claim 14, wherein the root mean square roughness (Sq) from 0.6 μm to 1.5 μm.

* * * * *